(12) United States Patent
Liu et al.

(10) Patent No.: US 11,480,731 B2
(45) Date of Patent: Oct. 25, 2022

(54) OPTICAL MODE SPLITTER

(71) Applicant: ROCKLEY PHOTONICS LIMITED, Oxford (GB)

(72) Inventors: Yangyang Liu, Glendora, CA (US); Andrea Trita, Pasadena, CA (US)

(73) Assignee: Rockley Photonics Limited, Oxford (GB)

( * ) Notice: Subject to any disclaimer, the term of this patent is extended or adjusted under 35 U.S.C. 154(b) by 0 days.

(21) Appl. No.: 16/880,926

(22) Filed: May 21, 2020

(65) Prior Publication Data

US 2021/0364698 A1     Nov. 25, 2021

(51) Int. Cl.
| | |
|---|---|
| *G02B 6/122* | (2006.01) |
| *G02B 6/12* | (2006.01) |
| *G02B 6/125* | (2006.01) |
| *G02B 6/126* | (2006.01) |
| *G02B 6/14* | (2006.01) |

(52) U.S. Cl.
CPC .......... *G02B 6/1228* (2013.01); *G02B 6/125* (2013.01); *G02B 6/126* (2013.01); *G02B 6/12014* (2013.01); *G02B 6/14* (2013.01); *G02B 2006/1215* (2013.01)

(58) Field of Classification Search
CPC ................................................... G02B 6/2773
See application file for complete search history.

(56) References Cited

U.S. PATENT DOCUMENTS

| | | | |
|---|---|---|---|
| 8,238,697 B2 * | 8/2012 | Little | G02B 6/1228 385/5 |
| 9,588,295 B2 * | 3/2017 | Onawa | G02B 6/12007 |
| 2008/0025665 A1 * | 1/2008 | Little | G02B 6/126 385/30 |
| 2014/0270620 A1 * | 9/2014 | Anderson | G02B 6/2706 385/11 |

OTHER PUBLICATIONS

Dai, D., "Mode conversion / coupling in submicron silicon-on-insulator optical waveguides and the applications", Proc. of SPIE, 2014, pp. 89890S-1 through 89890S-15, vol. 8989, SPIE.
International Search Report and Written Opinion of the International Searching Authority, dated Aug. 11, 2021, Corresponding to PCT/EP2021/063618, 14 pages.

* cited by examiner

*Primary Examiner* — Michelle R Connelly
(74) *Attorney, Agent, or Firm* — Lewis Roca Rothgerber Christie LLP

(57) ABSTRACT

A splitter. In some embodiments, the splitter includes an input waveguide; a first output waveguide; a second output waveguide; a first internal waveguide, connected to the input waveguide and to the first output waveguide, and a second internal waveguide, coupled to the first internal waveguide and connected to the second output waveguide. The splitter may be configured, when fed, at the input waveguide, power in a fundamental mode of the input waveguide or power in a first order spatial mode of the input waveguide: to transmit at least 80% of the power in the fundamental mode to the first output waveguide, and to transmit at least 80% of the power in the first order spatial mode to the second output waveguide.

10 Claims, 3 Drawing Sheets

OPTICAL MODE SPLITTER

FIELD

One or more aspects of embodiments according to the present disclosure relate to structures for guiding light, and more particularly to an optical waveguide splitter.

BACKGROUND

In various applications, light may be guided by a multimode waveguide (i.e., a waveguide capable of guiding more than one transverse, or "spatial", mode in each polarization state), and it may be advantageous to separate different spatial modes so that they propagate on different paths.

A splitter, or "mode splitter" for separating different spatial modes may be constructed as an asymmetric Y-junction at which a wide input waveguide (a multimode waveguide) is split into two output waveguides, one wider than the other. However, because of limitations of some fabrication processes, the gap between the output waveguides may be finite (e.g., 0.5 microns wide) at the Y, resulting in a discontinuity that may cause a degradation in performance.

Thus, there is a need for a waveguide splitter for splitting an input optical signal according to spatial mode.

SUMMARY

According to an embodiment of the present invention, there is provided a splitter, including: an input waveguide; a first output waveguide; a second output waveguide; a first internal waveguide connected to the input waveguide and to the first output waveguide; and a second internal waveguide, coupled to the first internal waveguide and connected to the second output waveguide, the splitter being configured, when fed, at the input waveguide, power in a fundamental mode of the input waveguide or power in a first order spatial mode of the input waveguide: to transmit at least 80% of the power in the fundamental mode to the first output waveguide, and to transmit at least 80% of the power in the first order spatial mode to the second output waveguide.

In some embodiments, the splitter includes: a decoupling region; and a transition region between the decoupling region and the input waveguide, the separation between the first internal waveguide and the second internal waveguide being: at a first point in the decoupling region, less than 2 microns, and at a second point in the decoupling region, greater than 2 microns, and the separation between the first internal waveguide and the second internal waveguide being, everywhere in the transition region, less than 2 microns.

In some embodiments, the first internal waveguide has: a first width at a first point in the transition region, and a second width at a second point in the transition region, the second point in the transition region being nearer to the decoupling region than the first point in the transition region, and the second width being less than the first width.

In some embodiments, the second internal waveguide has: a first width at the first point in the transition region, and a second width at the second point in the transition region, and the second width is greater than the first width.

In some embodiments, at the second point in the decoupling region, the first internal waveguide has a first width, and the second internal waveguide has a second width, less than the first width.

In some embodiments, in the decoupling region, the minimum width of the first internal waveguide is greater than the maximum width of the second internal waveguide.

In some embodiments, the first internal waveguide is tapered in the transition region, and the full taper angle of the first internal waveguide is less than 0.01 radians.

In some embodiments, the second internal waveguide is tapered in the transition region, and the full taper angle of the second internal waveguide is less than 0.01 radians.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of an optical coupler provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
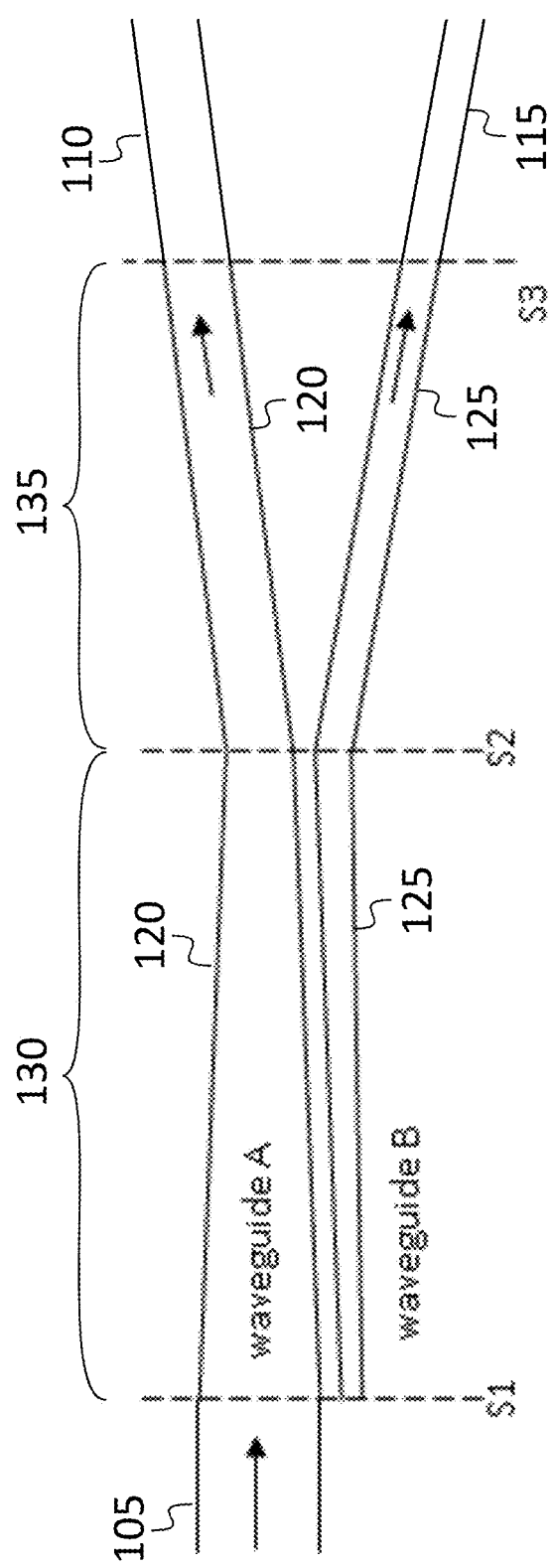
FIG. 1 is a schematic drawings of a spatial mode splitter, according to an embodiment of the present disclosure.
Figure 2C:
FIG. 2C is an illustration of an intensity pattern, in an embodiment of the present disclosure.

Referring to FIG. 1, in some embodiments a spatial mode splitter has an input waveguide 105 and two output waveguides, a first output waveguide 110, and a second output waveguide 115. The input waveguide 105 is a multi-mode waveguide, capable of guiding the fundamental modes (which may be referred to as the TE00 mode and the TM00 mode) and the first higher order modes (which may be referred to as the TE10 mode and the TM10 mode), Each of the output waveguides may be a single-mode waveguide, capable only of guiding the two fundamental modes. One output waveguide is wider than the other, so the modes of the two waveguides are not degenerate.

Figure 2B:
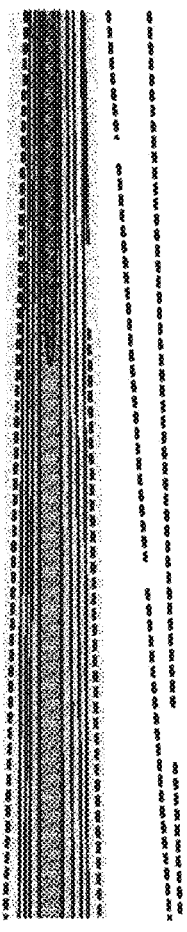
FIG. 2B is an illustration of an intensity pattern, in an embodiment of the present disclosure.

The spatial mode splitter may include a first internal waveguide 120 connected to the first output waveguide 110, and a second internal waveguide 125 connected to the second output waveguide 115. Each of the waveguides (the input waveguide, the output waveguides, and the internal waveguides) may be, for example, a strip waveguide or a rib waveguide. In a transition region 130 (between the first reference plane S1 and the second reference plane S2, in FIG. 1), the first internal waveguide 120 may be sufficiently close to the second internal waveguide 125 that evanescent coupling between the waveguides is significant. In some embodiments, the separation, or gap, between the waveguides is as small a gap as can be reliably fabricated with the fabrication process employed, e.g., it may be a separation of 0.5 microns. In the transition region 130, the internal waveguides are tapered; the width of first internal waveguide 120 decreases (in the direction from input to output) and the width of second internal waveguide 125 increases (in the direction from input to output), as shown, for example, in FIG. 1. The full taper angle of each of the internal waveguides (i.e., the angle between the sides, or double the angle (which may be referred to as the "half taper angle") between the centerline of the waveguide and either side) may be less than 0.01 radians. For either polarization (e.g., transverse electric (TE), or transverse magnetic (TM)), the fundamental mode (TE00 or TM00) adiabatically evolves, in the transition region 130, into the symmetric supermode of the evanescently coupled waveguides at S2, and the first order spatial mode (TE10 or TM10) adiabatically evolves, in the transition region 130, into the antisymmetric supermode of the evanescently coupled waveguides at S2. In some embodiments, the gap between the first internal waveguide 120 and the second internal waveguide 125 may be tapered (as illustrated in FIGS. 2B and 3B); more generally, any waveguide or gap between waveguides illustrated in any of the drawings as having constant width may, in some embodiments, be tapered.

In a decoupling region 135 (between the second reference plane S2 and the third reference plane S3, in FIG. 1), the gap between the first internal waveguide 120 and the second internal waveguide 125 is increased (e.g., as shown in FIG. 1), so that at the third reference plane S3 they are no longer evanescently coupled to a significant extent. In the decoupling region 135, the symmetric and antisymmetric supermodes at the second reference plane S2 are converted to the fundamental modes of the first internal waveguide 120 and of the second internal waveguide 125, respectively. In some embodiments, at least 80% of light launched into the input waveguide 105 in the fundamental mode is transmitted to the first output waveguide 110, and at least 80% of light launched into the input waveguide 105 in the TE10 mode is transmitted to the second output waveguide 115. The operation of the spatial mode splitter may be understood using the principle of adiabatic changes along a waveguide.

For either polarization state (e.g., for the TE polarization state) it may be seen that (if the second internal waveguide 125 is sufficiently narrow at the first reference plane S1), the eigenmodes of the composite waveguide (consisting of the first internal waveguide 120 and the second internal waveguide 125) immediately to the right of the first reference plane S1 are approximately the same as those of the input waveguide. It may further be seen that at the third reference plane S3 the two lowest-order eigenmodes of the composite waveguide (consisting of the first internal waveguide 120 and the second internal waveguide 125) are ones corresponding to the respective fundamental modes of the first internal waveguide 120 and the second internal waveguide 125. To the extent the adiabatic principle holds (e.g., if the tapers are sufficiently gradual), it then may be inferred that light entering the spatial mode splitter in the fundamental mode of the input waveguide will propagate to the fundamental mode of the first (wider) output waveguide 110 of the spatial mode splitter, which is the fundamental mode of the overall structure, and light entering the spatial mode splitter in the first order spatial mode of the input waveguide will propagate to the fundamental mode of the second (narrower) output waveguide 115 of the spatial mode splitter, which is the first order mode of the overall structure.

Figure 3C:
FIG. 3C is an illustration of an intensity pattern, in an embodiment of the present disclosure.
Figure 3B:
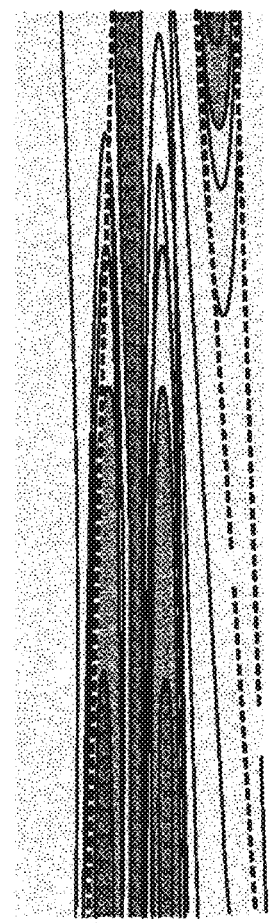
FIG. 3B is an illustration of an intensity pattern, in an embodiment of the present disclosure.
Figure 2A:
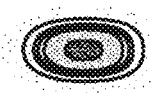
FIG. 2A is an illustration of an intensity pattern, in an embodiment of the present disclosure.
Figure 3A:
FIG. 3A is an illustration of an intensity pattern, in an embodiment of the present disclosure.

FIGS. 2A-3C are contour plots with contours showing lines of constant intensity. FIGS. 2A. 2C, 3A, and 3C show simulated mode patterns for (i) a case (in FIGS. 2A and 2C) in which the fundamental mode is launched into the input waveguide 105 and (ii) a case (in FIGS. 3A and 3C) in which a TE10 mode is launched into the input waveguide 105. The mode patterns shown are views taken along the direction of propagation at the first reference plane S1 (FIGS. 2A and 3A) and at the third reference plane S3 (FIGS. 2C and 3C). FIGS. 2B and 3B are top views of intensity patterns in the transition region 130 that result, respectively, when (i) the fundamental mode is launched into the input waveguide 105 and (ii) a TE10 mode is launched into the input waveguide 105.

Figure 4A:
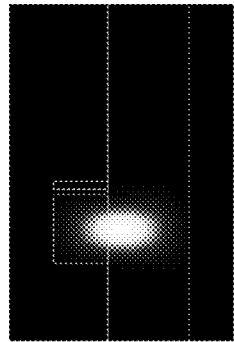
FIG. 4A is an illustration of an intensity pattern, in an embodiment of the present disclosure.
Figure 4B:
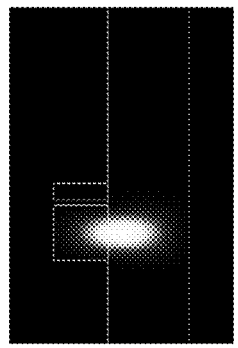
FIG. 4B is an illustration of an intensity pattern, in an embodiment of the present disclosure.
Figure 4C:
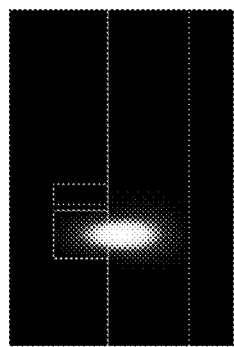
FIG. 4C is an illustration of an intensity pattern, in an embodiment of the present disclosure.
Figure 4D:
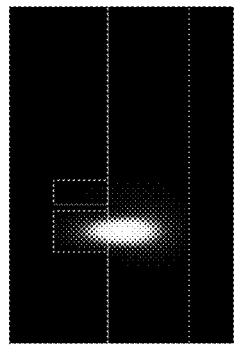
FIG. 4D is an illustration of an intensity pattern, in an embodiment of the present disclosure.
Figure 5A:
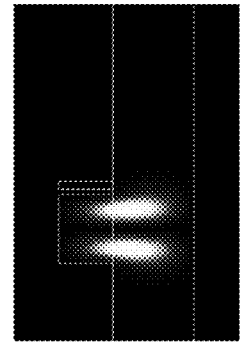
FIG. 5A is an illustration of an intensity pattern, in an embodiment of the present disclosure.
Figure 5B:
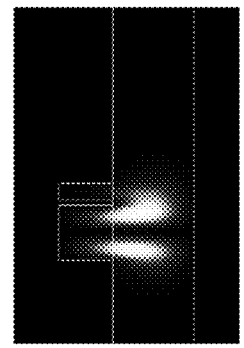
FIG. 5B is an illustration of an intensity pattern, in an embodiment of the present disclosure.
Figure 5C:
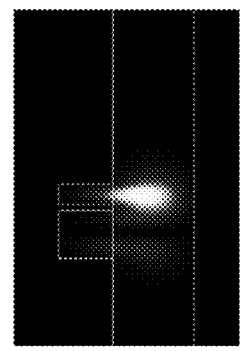
FIG. 5C is an illustration of an intensity pattern, in an embodiment of the present disclosure.
Figure 5D:
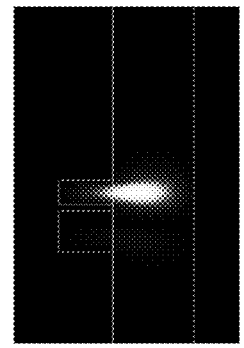
FIG. 5D is an illustration of an intensity pattern, in an embodiment of the present disclosure.

FIGS. 4A-5D show intensity patterns for the fundamental eigenmode (FIGS. 4A-4D) and the first order eigenmode (FIGS. 5A-5D) of the composite waveguide (consisting of the first internal waveguide 120 and the second internal waveguide 125) at the first reference plane S1 (FIGS. 4A and 5A), at a first intermediate plane, between the first reference plane S1 and the second reference plane S2 and nearer to the first reference plane S1 (FIGS. 4B and 5B), at a second intermediate plane, between the first reference plane S1 and the second reference plane S2 and nearer to the second reference plane S2 (FIGS. 4C and 5C), and at the second reference plane S2 (FIGS. 4D and 5D).

The spatial mode splitter is reciprocal, and the terms "input" and "output" are used herein only to distinguish different ports, each of which in general may be used as an input or as an output. As used herein, two waveguides are "connected" when non-evanescent waves may propagate from one to the other. As used herein, two waveguides are "connected" when the cores of the waveguides are physically joined. As used herein, two waveguides are "coupled" when optical power may transfer from one to the other through evanescent coupling. As used herein, the word "or" is inclusive, so that, for example, "A or B" means any one of (i) A, (ii) B, and (iii) A and B.

Although exemplary embodiments of an optical coupler have been specifically described and illustrated herein, many modifications and variations will be apparent to those skilled in the art. Accordingly, it is to be understood that an optical coupler constructed according to principles of this disclosure may be embodied other than as specifically described herein. The invention is also defined in the following claims, and equivalents thereof.

What is claimed is:
1. A splitter, comprising:
an input waveguide;

a first output waveguide, the first output waveguide being a single mode waveguide;

a second output waveguide, the second output waveguide being a single mode waveguide;

a first internal waveguide connected to the input waveguide and to the first output waveguide; and a second internal waveguide, coupled to the first internal waveguide and connected to the second output waveguide;

a decoupling region; and a transition region between the decoupling region and the input waveguide, the separation between the first internal waveguide and the second internal waveguide being:

at a first point in the decoupling region, less than 2 microns, and at a second point in the decoupling region, greater than 2 microns, and the separation between the first internal waveguide and the second internal waveguide being, everywhere in the transition region, less than 2 microns, the splitter being configured, when fed, at the input waveguide, power in a fundamental mode of the input waveguide or power in a first order spatial mode of the input waveguide:

to transmit at least 80% of the power in the fundamental mode to the first output waveguide, and to transmit at least 80% of the power in the first order spatial mode to the second output waveguide, and wherein, in the decoupling region, the minimum width of the first internal waveguide is greater than the maximum width of the second internal waveguide, and wherein the splitter is configured to receive, in the first internal waveguide from the input waveguide, light comprising a first component in a TE polarization state and a second component in a TM polarization state.

2. The splitter of claim 1, wherein the first internal waveguide has:

a first width at a first point in the transition region, and a second width at a second point in the transition region, the second point in the transition region being nearer to the decoupling region than the first point in the transition region, and the second width being less than the first width.

3. The splitter of claim 2, wherein the second internal waveguide has:

a first width at the first point in the transition region, and a second width at the second point in the transition region, and the second width is greater than the first width.

4. The splitter of claim 1, wherein the first internal waveguide is tapered in the transition region, and the full taper angle of the first internal waveguide in the transition region is less than 0.01 radians.

5. The splitter of claim 1, wherein the second internal waveguide is tapered in the transition region, and the full taper angle of the second internal waveguide in the transition region is less than 0.01 radians.

6. The splitter of claim 1, wherein eigenmodes of a composite waveguide comprising the first and second internal waveguides, at a point along the composite waveguide adjacent to where the first internal waveguide is connected to the input waveguide, are approximately the same as eigenmodes of the input waveguide.

7. The splitter of claim 1, wherein the first output waveguide is configured to guide light only of a fundamental mode of the first output waveguide corresponding to the fundamental mode of the input waveguide, and wherein the second output waveguide is configured to guide light only of a fundamental mode of the second output waveguide corresponding to the first order spatial mode of the input waveguide.

8. A method of using the splitter of claim 1, the method comprising:

receiving, in the first internal waveguide from the input waveguide, the light comprising the first component in the TE polarization state and the second component in the TM polarization state.

9. The method of using the splitter of claim 8, wherein the second component comprises power in the TM polarization state in the fundamental mode of the input waveguide, and wherein the method comprises transmitting at least 80% of the power in the TM polarization state in the fundamental mode of the input waveguide to the first output waveguide.

10. The method of using the splitter of claim 8, wherein the second component comprises power in the TM polarization state in the first order spatial mode of the input waveguide, and wherein the method further comprises transmitting at least 80% of the power in the TM polarization state in the first order spatial mode of the input waveguide to the second output waveguide.

* * * * *